(12) United States Patent
Iwamatsu et al.

(10) Patent No.: US 6,338,883 B1
(45) Date of Patent: Jan. 15, 2002

(54) LIQUID CRYSTAL COMPOSITION AND LIQUID CRYSTAL LIGHT MODULATING DEVICE

(75) Inventors: Masako Iwamatsu, Toyonaka; Nobuyuki Kobayashi, Kobe; Hideaki Ueda, Kishiwada, all of (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/458,703

(22) Filed: Dec. 13, 1999

(30) Foreign Application Priority Data

Dec. 14, 1998 (JP) .............................. 10-354959

(51) Int. Cl.$^7$ .............................. C09K 19/52; F21V 9/00
(52) U.S. Cl. .................. 428/1.1; 252/299.01; 252/582; 252/586
(58) Field of Search .................. 252/299.01, 582, 252/586; 349/66; 428/1.1

(56) References Cited

U.S. PATENT DOCUMENTS

| | | | |
|---|---|---|---|
| 3,917,481 A | 11/1975 | Saeva et al. | |
| 4,195,916 A | 4/1980 | Coates et al. | |
| 4,264,148 A | 4/1981 | Göbl-Wunsch et al. | |
| 5,061,047 A | * 10/1991 | Bradshaw et al. | 359/63 |
| 5,637,255 A | * 6/1997 | Kelly et al. | 252/299.61 |
| 5,801,796 A | * 9/1998 | Lowe | 349/73 |
| 5,807,499 A | * 9/1998 | Terashima et al. | 252/299.63 |
| 5,936,692 A | * 8/1999 | Van De Witte | 349/128 |
| 6,060,042 A | * 5/2000 | Schumacher et al. | 424/60 |
| 6,094,244 A | * 7/2000 | Kawata et al. | 349/74 |
| 6,122,024 A | * 9/2000 | Mlsen et al. | 349/88 |

FOREIGN PATENT DOCUMENTS

JP 57-174374 10/1982

* cited by examiner

Primary Examiner—Shean C. Wu
(74) Attorney, Agent, or Firm—Burns, Doane, Swecker & Mathis, LLP

(57) ABSTRACT

A reflective liquid crystal light modulating device which has a pair of substrates with electrodes thereon, at least one of which is transparent, and a liquid crystal composition which contains nematic liquid crystal and a plurality of chiral agents and exhibits a cholesteric phase in a room temperature between the substrates. The chiral agents include two chiral agents which have mutually opposite helical senses (cause liquid crystal to twist in mutually opposite directions), and the total content of the chiral agents in the liquid crystal composition is 10 to 45 wt %.

12 Claims, 3 Drawing Sheets

F I G. 7a
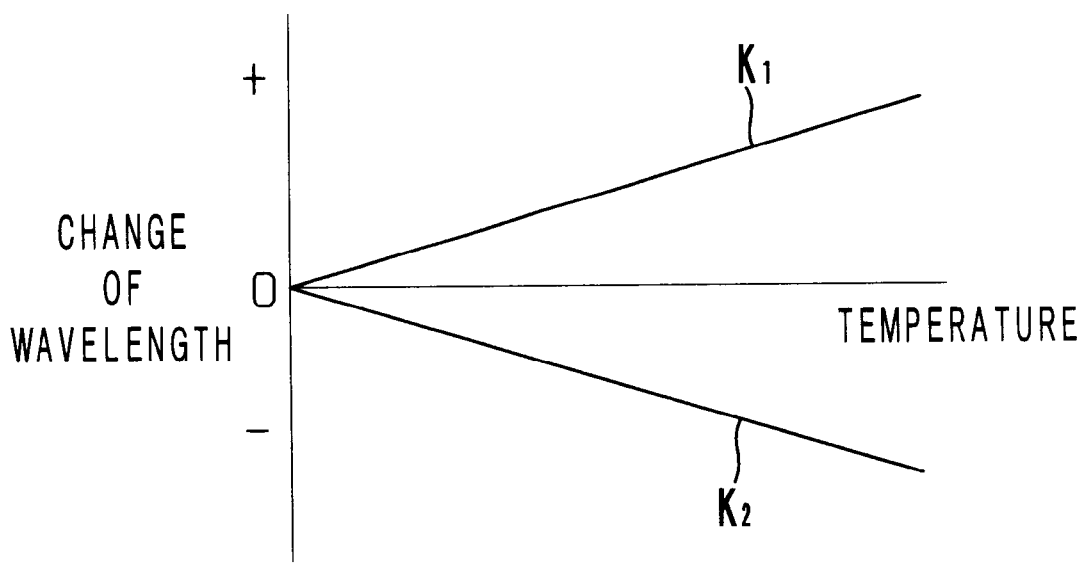
F I G. 7b
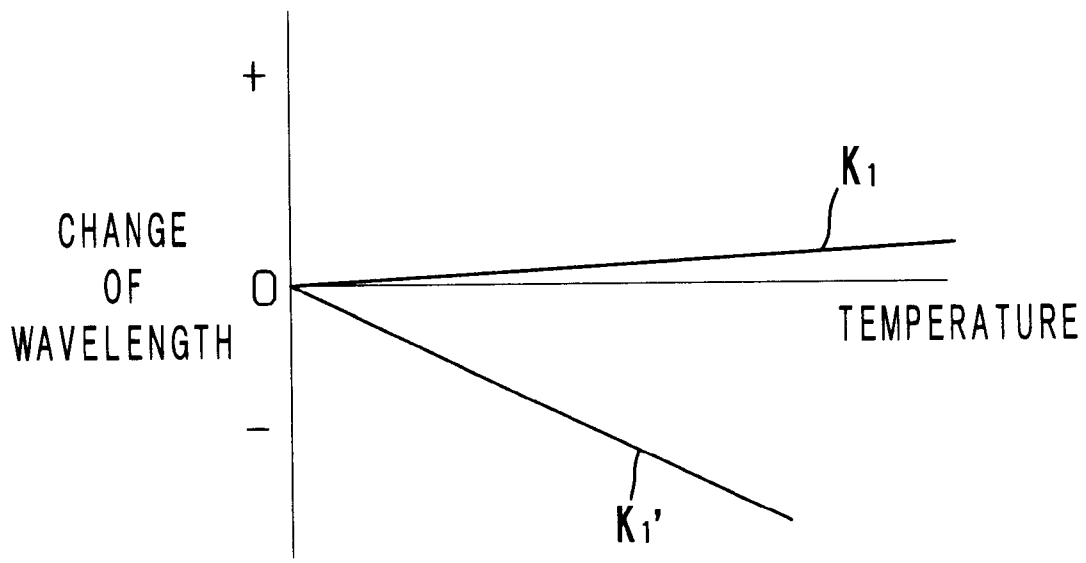

LIQUID CRYSTAL COMPOSITION AND LIQUID CRYSTAL LIGHT MODULATING DEVICE

This application is based on application No. 10-354959 filed in Japan, the content of which is hereby incorporated by reference.

BACKGROUND OF THE INVENTION

1. Field of the Invention

The present invention relates to a liquid crystal composition, and more particularly to a liquid crystal composition which exhibits a cholesteric phase in a room temperature and selectively reflects light of a specified wavelength in the visible spectrum. The present invention also relates to a non-volatile liquid crystal light modulating device which uses such a liquid crystal composition.

2. Description of Related Art

Recently, studies have been made to develop reflective liquid crystal displays by using chiral nematic liquid crystal which is produced by adding a chiral agent to nematic liquid crystal to cause the liquid crystal to exhibit a cholesteric phase in a room temperature. Such a liquid crystal display makes a display by switching between a planar state and a focal-conic state in accordance with the level of the pulse voltage applied thereto.

At present, however, in such a reflective liquid crystal display, the contrast between the planar state and the focal-conic state is not sufficiently high, and liquid crystal displays of this type which are satisfactory in properties, such as reflectance, phase transition temperature, etc., are yet to be developed.

SUMMARY OF THE INVENTION

It is a primary object of the present invention to provide an improved liquid crystal composition and an improved liquid crystal light modulating device. Further to this, it is other object of the present invention to provide a liquid crystal composition and a liquid crystal light modulating device which are good in properties, such as reflectance, phase transition temperature, etc., and have high contrast.

In order to attain the object, in a liquid crystal composition which contains liquid crystal and a plurality of chiral agents and exhibits a cholesteric phase in a room temperature, according to the present invention, the chiral agents include two chiral agents which have mutually opposite helical senses (cause liquid crystal to twist in mutually opposite directions), and the total content of the chiral agents in the liquid crystal composition is 10 to 45 wt %. Also, a liquid crystal light modulating device according to the present invention has such a liquid crystal composition between a pair of substrates, at least one of which is transparent.

According to the present invention, a plurality of chiral agents, including two chiral agents which have mutually opposite helical senses, are used. A chiral agent causes liquid crystal to twist and to exhibit a cholesteric phase in a room temperature, and the wavelength of light to be selectively reflected by the liquid crystal depends on the content of the chiral agent. By adding two chiral agents which have mutually opposite helical senses, domains which are different in twist direction are caused in the liquid crystal mixture. Thereby, in the planer state, light capable of going out to the observer side becomes large, which means an improvement in Y value (luminous reflectance) and reflectance, thereby resulting in an improvement in contrast.

It is thought that the improvement is achieved inasmuch as 1) both elliptical polarized light components of clockwise and counterclockwise directions are used for the reflection, and 2) some light components are scattered due to the unevenness among domains.

The total content of the chiral agents in the liquid crystal composition, in consideration for the reliability of the liquid crystal composition, shall be at most 45 wt %. Using a liquid crystalline compound as the principle chiral agent suppresses separation of the mixed chiral agents and crystallization of the chiral agents and improves the non-volatility. Also, it is possible to improve in phase transition temperature by using a chiral agent which is not so temperature dependent in a large amount. By use of the characteristics of various chiral agents, a liquid crystal composition with desired properties can be obtained.

BRIEF DESCRIPTION OF THE DRAWINGS

These and other objects and features of the present invention will be apparent from the following description with reference to the accompanying drawings, in which:

FIGS. 7a and 7b are graphs showing the temperature dependencies of chiral agents.

DETAILED DESCRIPTION OF THE PREFERRED EMBODIMENTS

Preferred embodiments of liquid crystal compositions and liquid crystal light modulating devices according to the present invention are described with reference to the accompanying drawings.

First Embodiment; See FIG. 1

Figure 1:
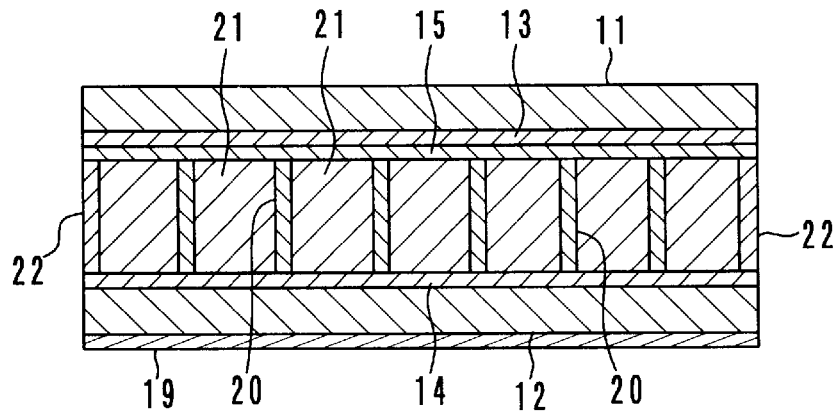
FIG. 1 is a sectional view of a liquid crystal display as the first embodiment of the present invention.

FIG. 1 is a sectional view of a liquid crystal display as the first embodiment of the present invention. In FIG. 1, numerals 11 and 12 are transparent substrates, on which transparent electrodes 13 and 14 are formed, respectively. The electrodes 13 and 14 are in the form of strips, and the respective electrode strips 13 and 14 are arranged in parallel. The extending direction of the electrode strips 13 and the extending direction of the electrode strips 14 cross each other, and the electrodes 13 and 14 face each other. An insulating layer 15 is coated on the electrodes 13. The numeral 20 is a polymeric structure serving as a space maintaining member, and the numeral 21 is a liquid crystal composition which exhibits a cholesteric phase in a room temperature. The materials of these members and combinations thereof will be described later, and further specific descriptions will be made referring to examples. The numeral 22 is a sealant which is to seal the liquid crystal composition in a cell. Additionally, a visible light absorbing layer 19 may be provided on the reverse side of the substrate 12, if necessary.

The liquid crystal display of this structure makes a display by application of a pulse voltage between the electrodes 13 and 14. More specifically, because a liquid crystal composition 21 which exhibits a cholesteric phase is used, when a pulse voltage with relatively high energy is applied thereto, the liquid crystal comes to a planar state and selectively reflects light of a wavelength determined by the helical pitch of the liquid crystal molecules and the refractive index. When a pulse voltage with relatively low energy is applied, the liquid crystal comes to a focal-conic state and becomes transparent. Each of the states is maintained even after stoppage of the application of the voltage. It has been found that an intermediate state between the focal-conic state and the planar state exists, and by applying a pulse voltage with medium energy to the liquid crystal, a display with a medium tone is possible. It seems that the focal-conic state and the planar state mix together in the intermediate state, and the intermediate state is also maintained even after stoppage of the application of the voltage. If a visible light absorbing layer 19 is provided, a black display is made in the focal-conic state.

In the liquid crystal display, the intersections of the electrode strips 13 and 14 are display pixels. In the following paragraphs, the area where light modulation is carried out by the liquid crystal is referred to as light modulation area, and the periphery of the light modulation area is a non-modulation area in which light modulation is not carried out. With respect to the liquid crystal display of the first embodiment, the light modulation area is a display area.

Substrate

At least one of the substrates 11 and 12 must be transparent. For a transparent substrate, not only glass but also flexible material such as polycarbonate, polyether sulfone, polyethylene terephthalate, etc. can be used.

Electrode

For the electrodes 13 and 14, transparent conductive films typically of ITO (indium tin oxide), metal such as aluminum silicone, etc., photoconductive films of amolphous silicone, BSO (bismuth silicone oxide) etc. can be used. In order to form the electrodes 13 and 14 in the form of strips, for example, an ITO film is formed on each of the substrates 11 and 12 by sputtering, and the ITO film is patterned by photolithography.

Insulating Layer, Alignment Controlling Layer, Color Filter

The insulating layer 15 may be either an inorganic film of e.g. silicone oxide or an organic film of e.g. polyimide resin, epoxy resin, acrylic resin or urethane resin. The insulating layer 15 functions as a preventive of short-circuit between the electrodes 13 and 14 and as a gas barrier layer to improve the reliability of the liquid crystal. Also, if polyimide resin or silicone resin is used, the layer 15 also functions as an alignment controlling layer. In addition, if a coloring agent is added to the layer 15, it will also function as a color filter. Further, the polymeric material which is used for the polymeric structure 20 can be also used for the insulating layer 15.

Spacer

Although they are not shown in FIG. 1, spacers may be provided between the substrates 11 and 12. For example, the spacers are spherical and made of resin or inorganic oxide. The spacers are to maintain the gap between the substrates 11 and 12 even. It is possible to use only the spherical spacers as a space maintaining member without providing the polymeric structure 20.

Liquid Crystal Composition

The liquid crystal composition is produced by adding a chiral agent to nematic liquid crystal. The addition of a chiral agent at an appropriate ratio causes the liquid crystal to exhibit a cholesteric phase in a room temperature. The wavelength of light to be selectively reflected by the liquid crystal composition can be controlled by changing the content of the chiral agent and can be set either within the visible spectrum or out of the visible spectrum. Further, a coloring agent may be added. Various kinds of nematic liquid crystal, with no particular limitations, are usable. More specifically, nematic liquid crystal containing a liquid crystalline ester compound, a liquid crystalline tolan compound, a liquid crystalline pyrimidine compound, a liquid crystalline phenylcyclohexile compound, a liquid crystalline cyano biphenyl compound, a liquid crystalline terphenyl compound or the like can be used. The nematic liquid crystal may be a mixture of a plurality of liquid crystalline compounds. If nematic liquid crystal containing a liquid crystalline ester compound or a liquid crystalline tolan compound is used, the anisotropy of dielectric constant and the anisotropy of refractive index will be large. Consequently, the liquid crystal composition will be good in responsibility to a driving voltage and in contrast, and the viscosity of the liquid crystal composition will be maintained in an appropriate range. In a case of using nematic liquid crystal containing a liquid crystalline ester compound or a liquid crystalline tolan compound, the liquid crystalline ester compound or the liquid crystalline tolan compound is preferably contained in the liquid crystal mixture at 50 wt % or more. The liquid crystal mixture may contain other liquid crystalline components such as a polycyclic compound which raises the phase transition temperature to isotropic phase, an N-type compound, etc.

A plurality of chiral agents, including two chiral agents which have mutually opposite helical senses (cause liquid crystal to twist in mutually opposite directions), are added to the nematic liquid crystal. The total content of the chiral agents is preferably 10 to 45 wt % of the liquid crystal composition. If the content of chiral agents is more than 45 wt %, there will arise a problem, for example, of necessitating a higher driving voltage.

Now, combinations of chiral agents which have mutually opposite helical senses are described. If two chiral agents which have the same helical sense are used, as the content of the chiral agents is increasing, the wavelength of light selectively reflected by the liquid crystal becomes shorter. As an example, the case shown by FIG. 7a is described. In this case, the temperature dependencies of the twistabilities of two chiral agents $K_1$ and $K_2$ are positive and negative, respectively, and are almost in the same extent. In other words, a change to the positive side in wavelength of light to be selectively reflected by the liquid crystal with addition of the chiral agents $K_1$ by itself is almost equal to a change to the negative side in wavelength of light to be selectively reflected by the liquid crystal with addition of the chiral agent $K_2$ by itself. In this case, by adding the chiral agents $K_1$ and $K_2$ at a ratio of 1:1, the usable temperature range can be set sufficiently large while the wavelength of light to be selectively reflected by the liquid crystal is controlled. The term "twistability" means the inverse number of the helical pitch of liquid crystal which is attained by the chiral agent.

On the other hand, if the chiral agent $K_1$ and a chiral agent $K_1$ which have mutually opposite helical senses are added to liquid crystal, these chiral agents $K_1$ and $K_1'$ counteract each other's effect of changing the wavelength of light to be selectively reflected by the liquid crystal, and the mixing ratios of these chiral agents $K_1$ and $K_1'$ to cause the liquid crystal to selectively reflect light of a desired wavelength shall be determined in consideration for the counteraction. At this time, however, if the content of one of the chiral agents is merely increased in consideration for the counteraction, the total content of the chiral agents in the liquid crystal composition will be too large, thereby causing a problem such as separation of components. Therefore, a limit must be set to the content of the chiral agents. In order to guarantee a sufficiently large usable temperature range under these conditions, the temperature dependencies of the twistabilities of the chiral agents $K_1$ and $K_1'$ must be mutually opposite, namely, positive and negative, and must be in different extents. Also, the chiral agent of which twistability is more temperature dependent shall be used less, and the chiral agent of which twistability is less temperature dependent shall be used more.

For example, if the temperature dependency of the twistability of the chiral agent $K_1$ is smaller than the temperature dependency of the twistability of the chiral agent $K_1'$ as FIG. 7b shows, the chiral agent $K_1$ shall be used more, and the chiral agent $K_1'$ shall be used less. Thereby, while the total content of the chiral agents is limited, the wavelength of light to be selectively reflected by the liquid crystal can be controlled to a desired value, and the usable temperature range can be guaranteed to be sufficiently large. Especially when the temperature dependency of the twistability of the chiral agent $K_1$ is sufficiently small as FIG. 7b shows, even if the chiral agent $K_1$ is used in a relatively large amount, a change in wavelength of light to be selectively reflected by the liquid crystal with a change in temperature is small. Therefore, the wavelength of light to be selectively reflected by the liquid crystal may be determined from the content of this chiral agent $K_1$. Also, when the temperature dependency of the twistability of the chiral agent $K_1'$ is sufficiently large as FIG. 7b shows, use of the chiral agent $K_1'$ in only a small amount can counteract the temperature dependency of the wavelength of light selectively reflected by the liquid crystal composition which is attributed to the chiral agent $K_1$. Consequently, the total amount of used chiral agents can be minimized.

From the inventors' studies, the following thing has been found: when two kinds of chiral agents which have mutually opposite helical senses are added to liquid crystal, in the liquid crystal composition, there arise domains wherein liquid crystal twist in mutually different directions, whereby, in the planer state, light capable of going out to the observer side becomes large, which improves the Y value (luminous reflectance) and the reflectance, resulting in an improvement in contrast. If the chiral agents $K_1$ and $K_1'$ shown by FIG. 7b are used, the use of the chiral agent $K_1'$ even in a small amount relatively to the amount of the chiral agent $K_1$ is advantageous because the chiral agent $K_1'$ has obvious effects of improving the display performance and of enlarging the usable temperature range. Even if the twistability of the chiral agent $K_1$ is substantially independent on temperature, the use of the chiral agent $K_1'$ is significant. Also, it has been found that by increasing the mixing ratio of a chiral agent which has a twistability with a small temperature dependency in all the chiral agents added to liquid crystal, the phase transition temperature to isotropic phase of the liquid crystal can be raised.

Further, the temperature dependency of the twistability of a chiral agent changes more or less depending on the nematic liquid crystal to which the chiral agent is added. Therefore, the contents and the mixing ratios of chiral agents shall be determined in accordance with the nematic liquid crystal used.

If the total content of the chiral agents is more than 45 wt %, there may arise problems such as separation of components, etc. Therefore, when two kinds of chiral agents which have mutually opposite helical senses and have twistabilities with mutually different temperature dependencies, the chiral agent which has a twistability with a larger temperature dependency shall be mixed at most 1/3, and preferably 1/5 of the other chiral agent. With respect to the chiral agent which has a twistability with a larger temperature dependency, larger the twistability, the less the amount used. Generally, the chiral agent which has a twistability with a larger temperature dependency is used at least 1/50, and preferably 1/10 of the other chiral agent.

It is preferred that within the usable temperature range, a change in wavelength of light selectively reflected by the liquid crystal composition with a change in temperature will not cause a recognizable display change. Specifically, if the wavelength of light selectively reflected changes ±10 nm within a temperature range from 25° C. to 60° C., it is generally regarded to be good.

The chiral agents are, for example, biphenyl compounds, terphenyl compounds, ester compounds, etc. which cause nematic liquid crystal to be of a helical structure (structure wherein liquid crystal molecules rotate at 360° along the spiral structure of the liquid crystal molecules). Chiral agents in the market which have an optically active group at an end, such as S811, C15, CB15 and R1011 (made by Merck & Company), can be used. Also, cholesteric liquid crystal with a cholesterol ring, which is typified by cholesteric nonanate, can be used.

The following general chemical formulas (A) through (F) and specific chemical formulas $(A_1)$ through $(A_{10})$, $(B_1)$ through $(B_{10})$, $(C_1)$ through $(C_{10})$, $(D_1)$ through $(D_{10})$, $(E_1)$ through $(E_{10})$ and $(F_1)$ through $(F_9)$ show usable chiral agents. All of these substances have an optically active group, and in each of the substances, there are optical isomers which have mutually different helical senses, and more particularly cause liquid crystal to be levorotatory and dextrotatory, respectively.

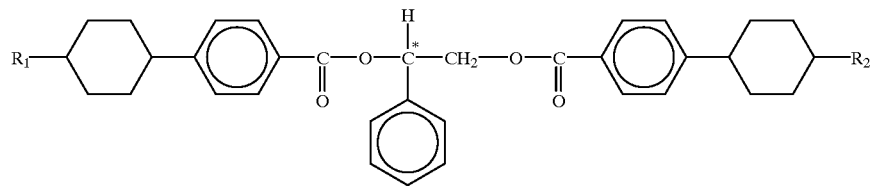
(A)
R1, R2: alkyl or alkoxyl with one to ten carbons
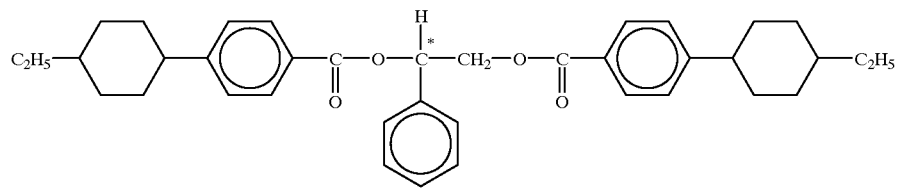
(A₁)
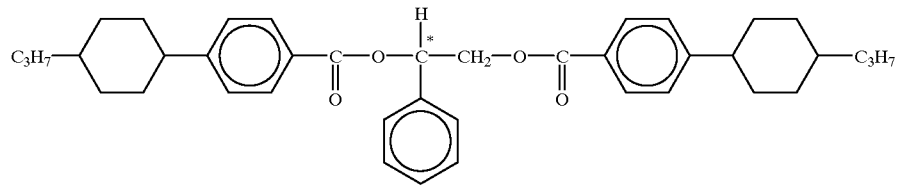
(A₂)
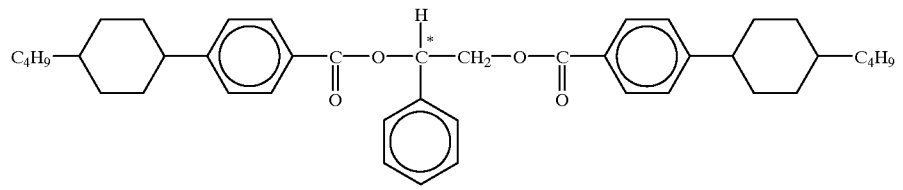
(A₃)
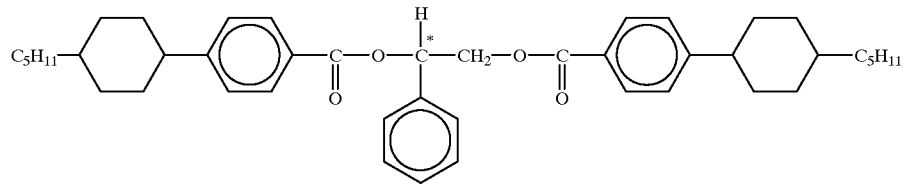
(A₄)
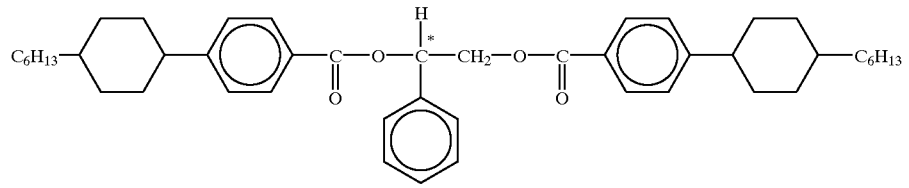
(A₅)

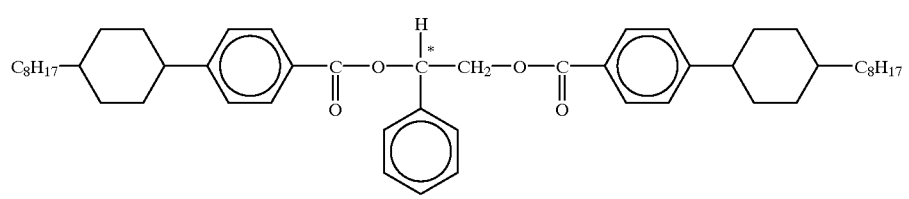
(A6)
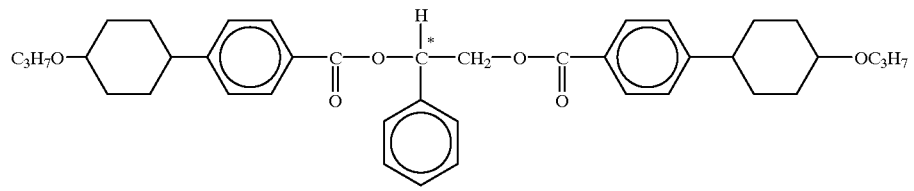
(A7)
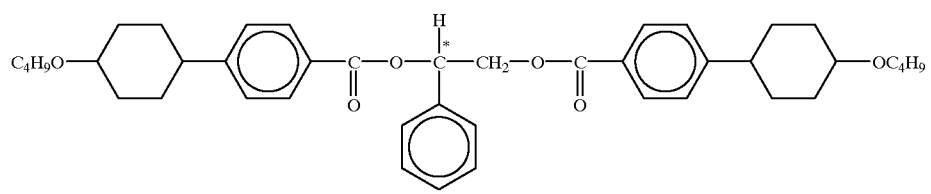
(A8)
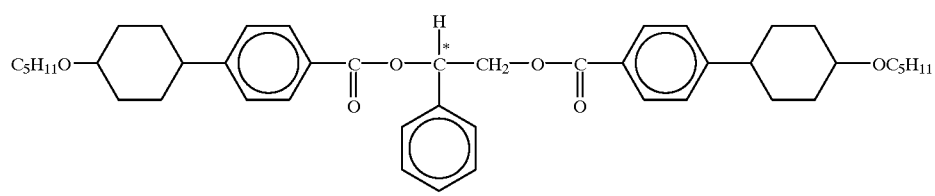
(A9)
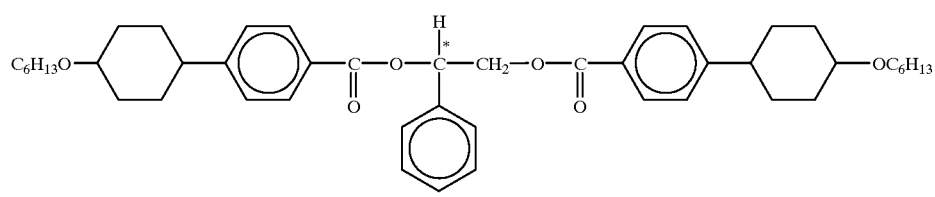
(A10)
R: alkyl with one to ten carbons
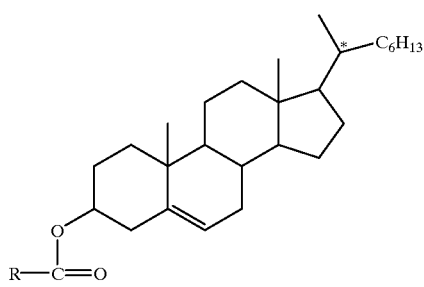
(B)
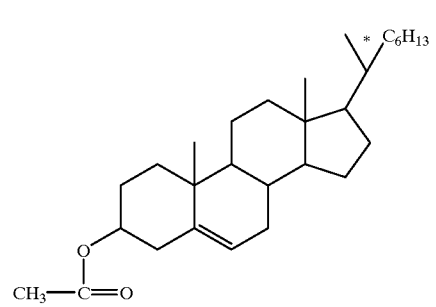
(B1)

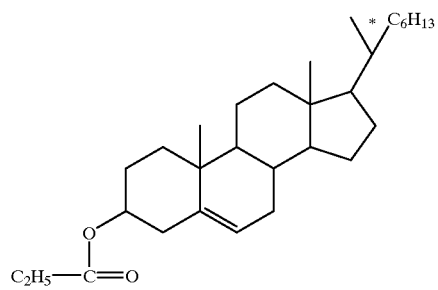 (B2)
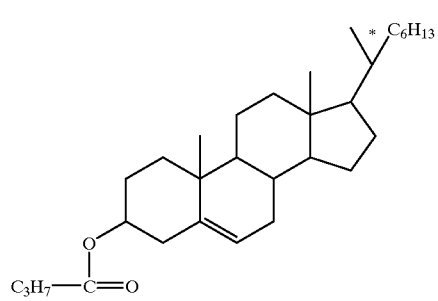 (B3)
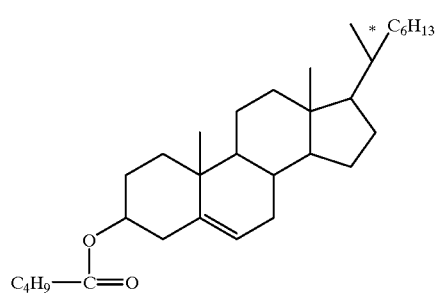 (B4)
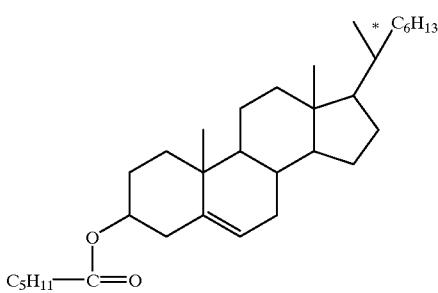 (B5)
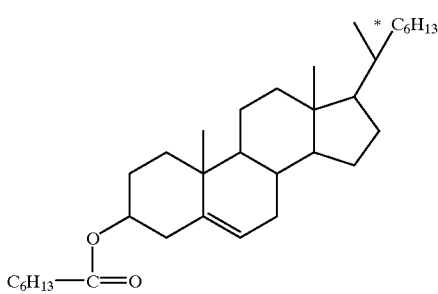 (B6)
 (B7)
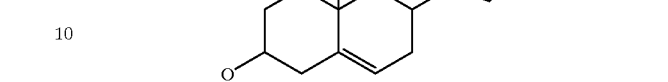 (B8)
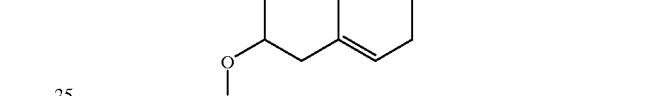 (B9)
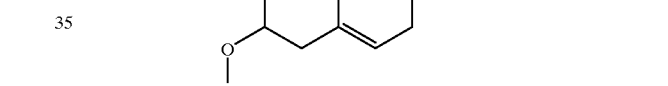 (B10)
 (C)
R₁: alkyl or alkoxyl with one to ten carbons R₂: alkyl with two to ten carbons
(C₁)
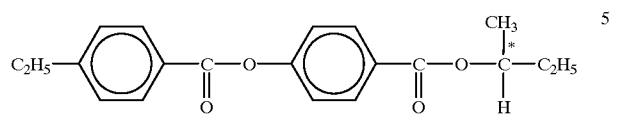
(C₂)
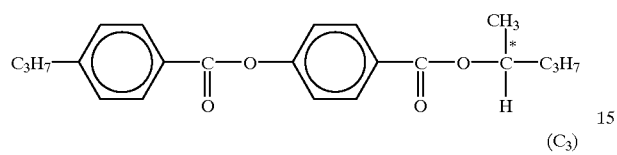
(C₃)
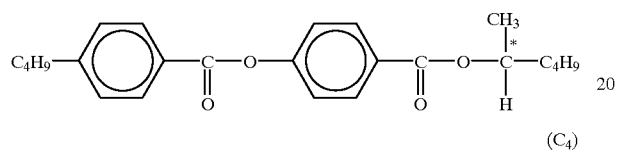
(C₄)
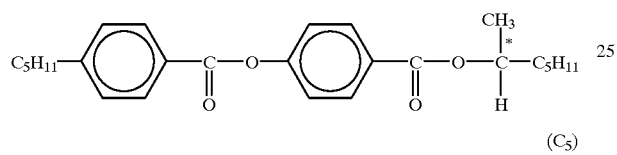
(C₅)
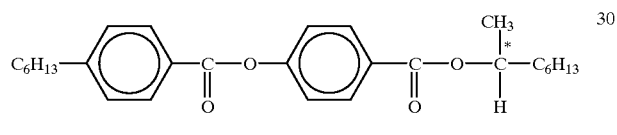
(C₆)
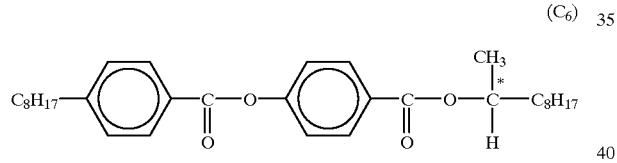
(C₇)
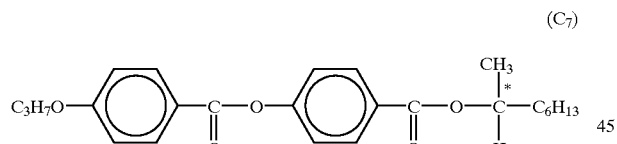
(C₈)
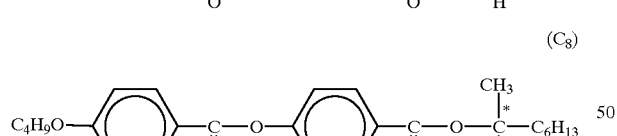
(C₉)
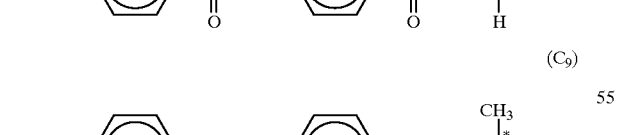
(C₁₀)
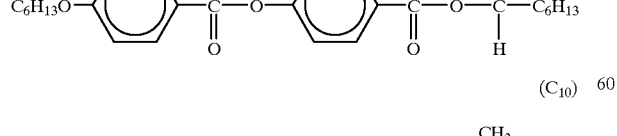
(D)
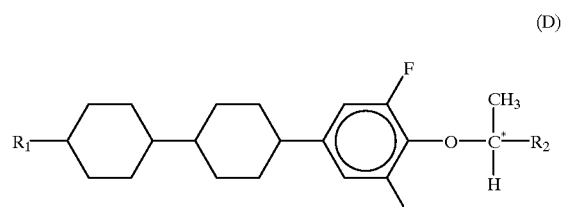
R₁: alkyl or alkoxyl with one to ten carbons
R₂: alkyl with two to ten carbons
(D₁)
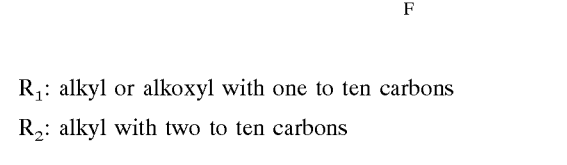
(D₂)
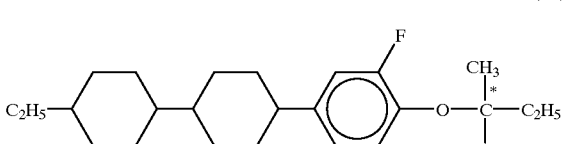
(D₃)
(D₄)
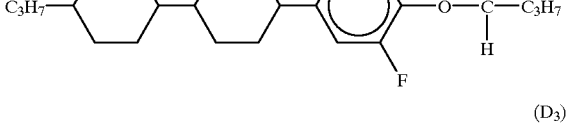
(D₅)
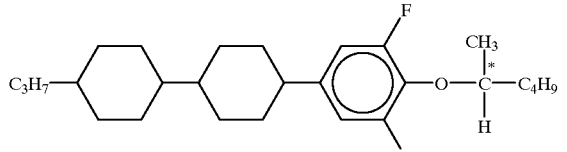
(D₆)
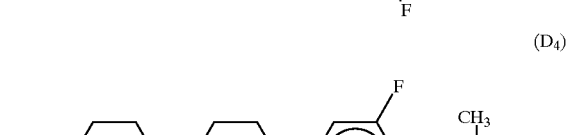

-continued
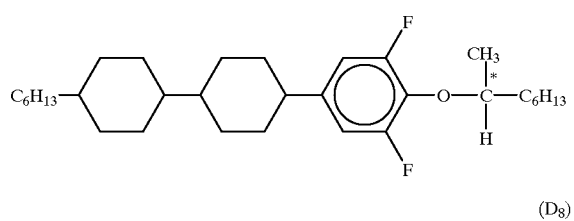
(D7)
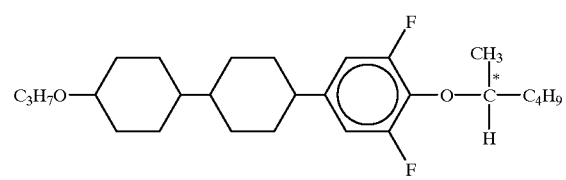
(D8)
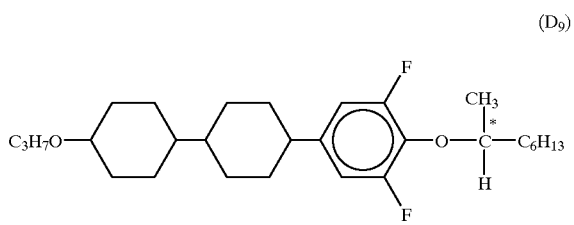
(D9)
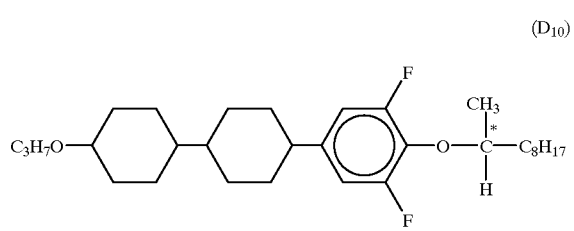
(D10)
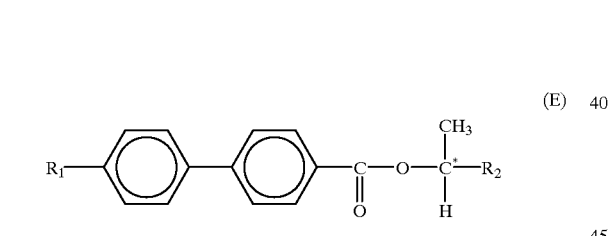
(E)
R₁: alkyl or alkoxyl with one to ten carbons
R₂: alkyl with two to ten carbons
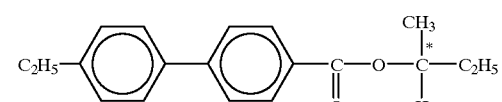
(E1)
(E2)
(E3)
-continued
(E4)
(E5)
(E6)
(E7)
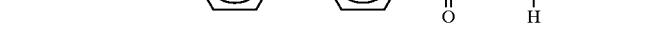
(E8)
(E9)
(E10)
(F)
R: alkyl with two to ten carbons
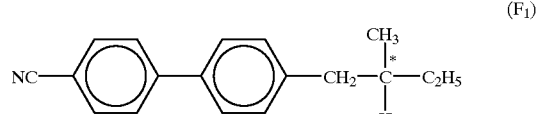
(F1)
(F2)
(F3)

-continued

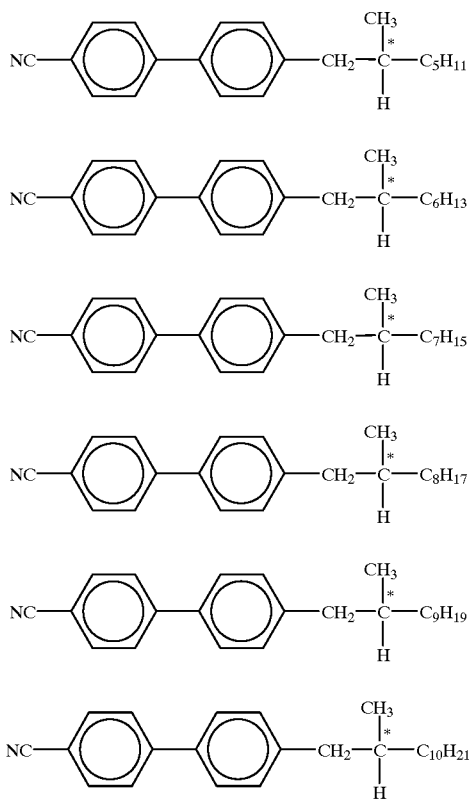

As the coloring agent to be added, various well-known coloring agents, such as azo compounds, quinone compounds, anthraquinone compounds, dichroic dyes, etc. are usable, and two or more of these coloring agents can be used. The content of the coloring agent(s) is preferably not more than 3 wt %.

Polymeric Structure

The polymeric structure 20 is composed of columns of any shape, for example, cylinders, square poles or elliptic cylinders which may be arranged either in a specified pattern such as a grating or at random. The polymeric structure 20 maintains the gap between the substrates even and improves the strength of the liquid crystal display. If the columns of the polymeric structure 20 are arranged at regular intervals, the display performance is uniformed.

The polymeric structure 20 can be formed of photosetting resin by photolithography. Specifically, photosetting resin such as a photoresist material made of ultraviolet ray setting monomer is coated in a specified thickness on one of the substrates, and pattern exposure of the photosetting resin is carried out, for example, by radiating ultraviolet rays through a mask. Then, the unhardened portion of the photosetting resin is removed.

Also, the polymeric structure 20 can be made of thermosetting resin. In this case, thermosetting resin which is dissolved in a suitable solvent is used. In supplying the thermosetting resin on one of the substrates, a printing method wherein the thermosetting resin is pushed out onto the substrate by a squeegee through a screen or a metal mask, a dispenser method or an ink jet method wherein the thermosetting resin is injected from the end of a nozzle onto the substrate and a transfer method wherein the thermosetting resin is once dispensed on a plate or a roller and is transferred onto the substrate can be adopted. Then, the other substrate is laid on the substrate with the thermosetting resin in-between, and heat and pressure are applied. In this way, a liquid crystal cell which has a polymeric structure between substrates is fabricated.

In order to produce a liquid crystal display, thereafter, the liquid crystal composition is filled in the cell by a vacuum injection method or the like. Also, the following method is possible: the liquid crystal composition is dropped on one of the substrates when the substrates are laminated, and the liquid crystal is sealed between the substrates simultaneously with bonding of the substrates.

Sealant

The sealant 22 is to seal the liquid crystal composition 21 between the substrates 11 and 12 for prevention of liquid crystal leakage. As the sealant 21, thermosetting resin such as epoxy resin and acrylic resin, and photosetting adhesives can be used.

Second Embodiment

Figure 2:
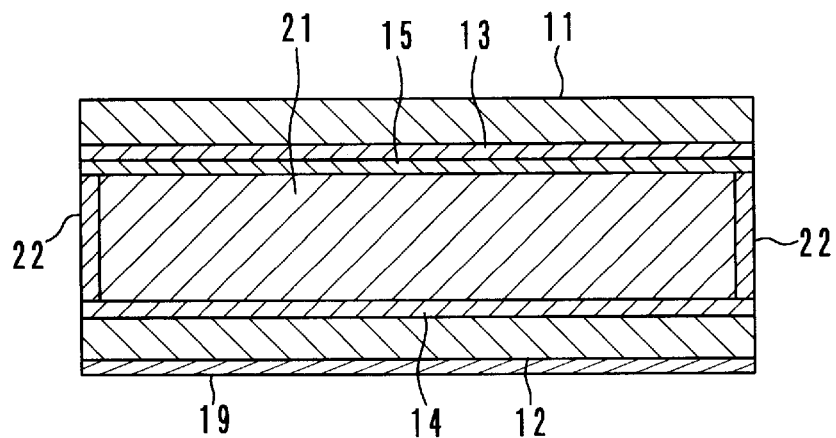
FIG. 2 is a sectional view of a liquid crystal display as the second embodiment of the present invention.

FIG. 2 is a sectional view of a liquid crystal display as the second embodiment of the present invention. This liquid crystal display is basically of the same structure as the first embodiment shown by FIG. 1, but the second embodiment is not provided with a polymeric structure in the display area. In FIG. 2, the same members are provided with the same reference symbols as shown in FIG. 1. The liquid crystal display of this structure is advantageous to an increase of actual modulation area and to simplification of manufacture.

Third Embodiment; See FIG. 3

Figure 3:
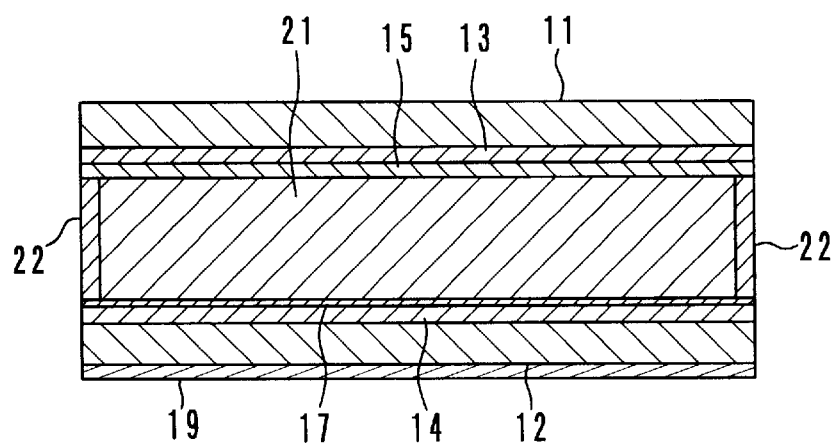
FIG. 3 is a sectional view of a liquid crystal display as the third embodiment of the present invention.

FIG. 3 is a sectional view of a liquid crystal display as the third embodiment of the present invention. This liquid crystal display is basically of the same structure as the second embodiment without a polymeric structure. In the third embodiment, an alignment controlling layer 17 is provided on the electrodes 14 of the substrate 12. In FIG. 3, the same members are provided with the same reference symbols as shown in FIG. 2. In the liquid crystal display of the third embodiment, the alignment controlling layer 17 brings an anchoring effect toward the liquid crystal molecules, and the liquid crystal can be prevented from changing in characteristics with aging of the liquid crystal display, compared with the liquid crystal display shown by FIG. 2.

Fourth Embodiment; See FIG. 4

Figure 4:
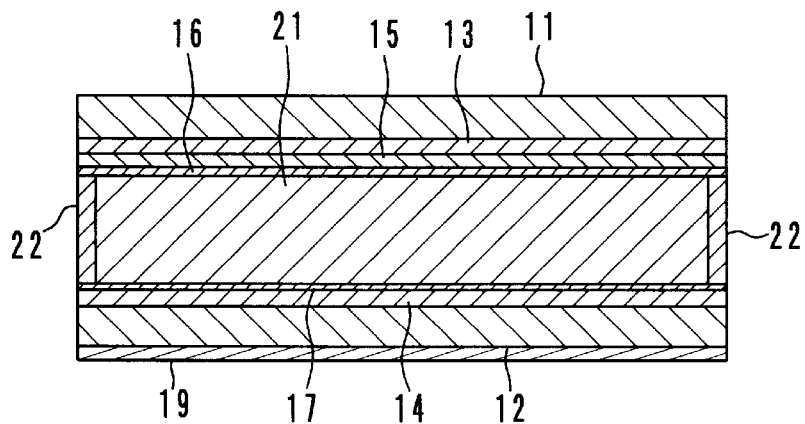
FIG. 4 is a sectional view of a liquid crystal display as the fourth embodiment of the present invention.

FIG. 4 is a sectional view of a liquid crystal display as the fourth embodiment of the present invention. This liquid crystal display is basically of the same structure as the third embodiment. In the fourth embodiment, in addition to the alignment controlling layer 17, an alignment controlling layer 16 is further provided on the insulating layer 15 on the substrate 11. In FIG. 4, the same members are provided with the same reference symbols as shown in FIG. 3. The liquid crystal display of this structure can prevent the liquid crystal from changing in characteristics with aging of the liquid crystal display more effectively.

Fifth Embodiment; See FIG. 5

Figure 5:
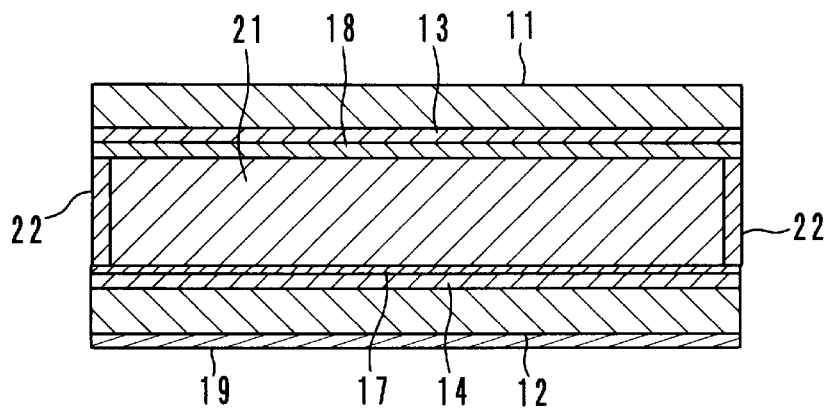
FIG. 5 is a sectional view of a liquid crystal display as the fifth embodiment of the present invention.

FIG. 5 is a sectional view of a liquid crystal display as the fifth embodiment of the present invention. This liquid crystal display is basically of the same structure as the second embodiment. In the fifth embodiment, a color filter 18 is provided on the electrodes 13 of the substrate 11. In FIG. 5, the same members are provided with the same reference symbols as in FIG. 2. In the liquid crystal display of the fifth embodiment, scattering components other than selectively reflected light can be reduced compared with the liquid crystal display shown by FIG. 2, and the display performance can be improved.

Sixth Embodiment; See FIG. 6

Figure 6:
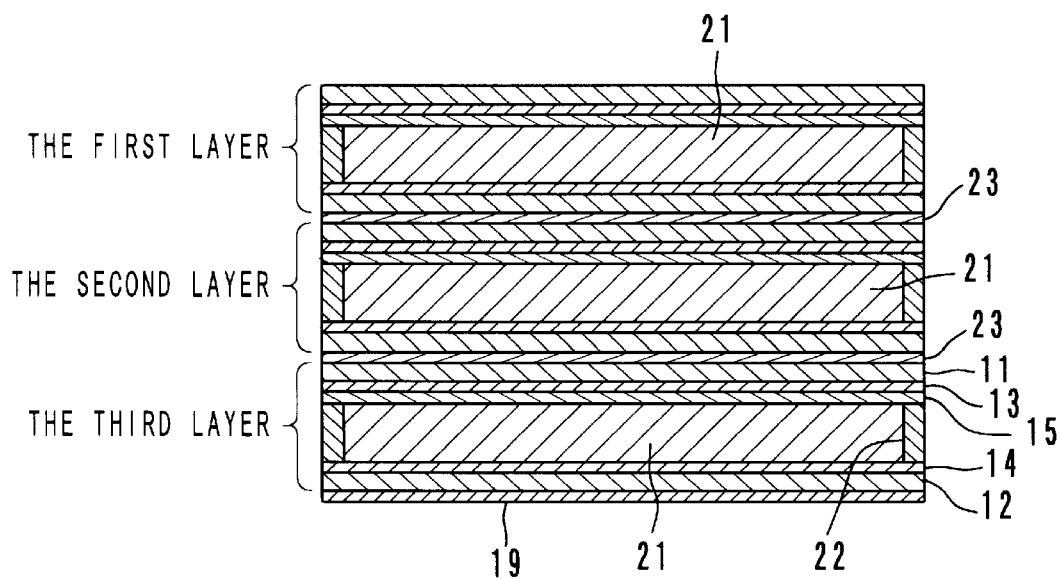
FIG. 6 is a sectional view of a liquid crystal display as the sixth embodiment of the present invention.

FIG. 6 is a sectional view of a liquid crystal display as the sixth embodiment of the present invention. This is a full-color reflective liquid crystal display which has three layers which have liquid crystal compositions 21 which selectively reflect light of mutually different wavelengths. The layers are joined together by a transparent adhesive 23. The liquid crystal composition 21 of the first layer selectively reflects light of around 490 nm (blue); that of the second layer selectively reflects light of around 560 nm (green); and that of the third layer selectively reflects light of around 680 nm (red).

This liquid crystal display makes a full color display by switching the liquid crystal of each layer among a planar state, a focal-conic state and an intermediate state between the planar state and the focal-conic state in accordance with color image data which were obtained from image data by RGB color separation.

EXPERIMENTAL EXAMPLE 1

To nematic liquid crystal which contains a mixture of liquid crystal ester compounds at 58 wt % (anisotropy of refractive index $\Delta n=0.140$, anisotropy of dielectric constant $\Delta \epsilon=30.8$, phase transition temperature to isotropic phase $T_{N-I}=102°$ C.), the chiral agents of the chemical formulas ($D_4$) and ($C_9$) were added at 32.4 wt % and 6.1 wt %, respectively. Thus, a liquid crystal composition which selectively reflects light of around 550 nm was prepared. The chiral agents of the chemical formulas ($D_4$) and ($C_9$) used in this example have mutually opposite helical senses. The helical power of the chiral agent ($C_9$) used as the principal component is positive temperature dependent, and that of the chiral agent ($D_4$) used as the side component is negative temperature dependent. The temperature dependency of the helical power of the chiral agent ($C_9$) is smaller than that of the chiral agent ($D_4$).

The temperature dependency of the liquid crystal composition was measured. As a result, the wavelength of light selectively reflected by the liquid crystal composition changed within approximately 10 nm in a temperature range from 25° C. to 60° C. The phase transition temperature to isotropic phase of this liquid crystal composition was 85° C.

Next, two PES films which have transparent electrodes thereon were used as the substrates. On the electrode surface of one of the substrates (first substrate), an alignment controlling layer with a thickness of 800 Å was formed of AL4552 (made by JSR Co., Ltd.). At that time, the alignment controlling layer was not subjected to rubbing. Thereafter, spacers with a particle diameter of 7 μm were dispersed thereon, and a sealant XN21S (made by Mitsui Chemicals Co., Ltd.) was screen-printed on the periphery to form an endless ring seal.

On the electrode surface of the other substrate (second substrate), an insulating layer with a thickness of 2000 Å was formed of HIM3000 (made by Hitachi Kasei Co., Ltd.), and an alignment controlling layer with a thickness of 800 Å was formed of AL4552 (made by JSR Co., Ltd.). The alignment controlling layer was not subjected to rubbing. Further, on the alignment controlling layer, thermosetting resin dissolved in a solvent was screen-printed by a squeegee through a metal mask which has holes with a diameter of 100 μm arranged at regular intervals of approximately 500 μm in a grating. Thus, a polymeric structure with a height of approximately 7 μm was formed.

Thereafter, the second substrate was placed on a plate, and the liquid crystal composition was dropped at an end of the surface with the polymeric structure formed thereon. An end of the first substrate was laid on the end of the second substrate where the liquid crystal composition had been dropped, with the electrode surface of the first substrate facing the second substrate, and the substrates were joined together by a heating/pressing roller while the liquid crystal composition was spread out. Then, the substrates were heated at 150° C. for one hour and thereafter naturally cooled down. In this way, while the substrates were joined together by the polymeric structure and the sealant while the liquid crystal was sealed in the substrates.

Further, a light absorbing layer of black color was provided on the reverse side of the second substrate. Finally, a liquid crystal display was produced.

In this liquid crystal display, when a pulse voltage of 50V was applied between the electrodes for five milliseconds, the liquid crystal came to a focal-conic state (became transparent), and the Y value was 1.74. When a pulse voltage of 90 V was applied for five milliseconds, the liquid crystal came to a planar state (showed green), and the Y value was 24.2. Accordingly, the contrast was 13.9. The color purity was 72.7, and the reflectance was 41.8.

The Y value (luminous reflectance) and the reflectance were measured by use of a spectrocolorimeter CM-3700d (made by Minolta Co., Ltd.) which has a white light source. In the experimental examples and comparative examples below, the same spectrocolorimeter was used.

With respect to contrast, color purity and reflectance, there are respective suitable ranges for red, green and blue. Generally, it is required that these values must be high for green.

COMPARATIVE EXAMPLE 1

To nematic liquid crystal which contains the mixture of liquid ester compounds, which were used in the experimental example 1, at 58 wt %, the chiral agent of the chemical formula ($D_4$) was added at 8.5 wt %. Thus, a liquid crystal composition was prepared. The wavelength of light selectively reflected by the liquid crystal composition was out of the visible spectrum.

COMPARATIVE EXAMPLE 2

To nematic liquid crystal which contains the mixture of liquid ester compounds, which were used in the experimental example 1, at 58 wt %, the chiral agents of the chemical formulas ($D_4$) and ($C_9$) were added at 13.8 wt % and 12.5 wt %, respectively. Thus, a liquid crystal composition which selectively reflects light of around 550 nm was prepared. The chiral agents ($C_9$) and ($D_4$) used in this example have the same helical sense. Specifically, the chiral agent ($C_9$) used in this example is an optical isomer of the chiral agent ($C_9$) which was used in the experimental example 1.

The temperature dependency of the liquid crystal composition was measured. As a result, the wavelength of light selectively reflected by the liquid crystal composition changed within approximately 10 nm in a temperature range from 25° C. to 60° C. The phase transition temperature to isotropic phase of the liquid crystal composition was 70° C.

A liquid crystal display was produced using this liquid crystal composition in the same procedure carried out in experimental example 1.

In this liquid crystal display, when a pulse voltage of 50 V was applied between the electrodes for five milliseconds, the liquid crystal came to a focal-conic state (became transparent), and the Y value was 1.87. When a pulse voltage of 90 V was applied for five milliseconds, the liquid crystal came to a planar state (showed green), and the Y value was 22.9. Accordingly, the contrast was 12.2. The color purity was 69.9, and the reflectance was 38.2. The phase transition temperature to isotropic phase was 70° C.

EXPERIMENTAL EXAMPLE 2

To nematic liquid crystal which contains a mixture of liquid crystal tolan compounds at 51 wt % (anisotropy of refractive index $\Delta n$=0.280, anisotropy of dielectric constant $\Delta\epsilon$=8.4, phase transition temperature to isotropic phase $T_{N-I}$=91° C.), the chiral agents of the chemical formulas ($F_2$) and ($A_4$) were added at 28.6 wt % and 0.78 wt %, respectively. Thus, a liquid crystal composition which selectively reflects light of around 550 nm was prepared. The chiral agents of the chemical formulas ($F_2$) and ($A_4$) used in this example have mutually opposite helical senses. The helical power of the chiral agent ($F_2$) used as the principal component is positive temperature dependent, and that of the chiral agent ($A_4$) used as the side component is negative temperature dependent. The temperature dependency of the helical power of the chiral agent ($F_2$) is smaller than that of the chiral agent ($A_4$).

The temperature dependency of the liquid crystal composition was measured. As a result, the wavelength of light selectively reflected by the liquid crystal composition changed within approximately 10 nm in a temperature range from 25° C. to 60° C. The phase transition temperature to isotropic phase of this liquid crystal composition was 80° C.

A liquid crystal display was produced using this liquid crystal composition was produced in the same procedure carried out in experimental example 1.

In the liquid crystal display, when a pulse voltage of 60 V was applied between the electrodes for five milliseconds, the liquid crystal came to a focal-conic state (became transparent), and the Y value was 2.13. When a pulse voltage of 90 V was applied for five milliseconds, the liquid crystal came to a planar state (showed green), and the Y value was 25.23. Accordingly, the contrast was 11.85. The color purity was 76.2, and the reflectance was 39.8.

COMPARATIVE EXAMPLE 3

To nematic liquid crystal which contains the mixture of tolan compounds used in experimental example 2 at 51 wt %, the chiral agents of the chemical formula ($F_2$) and ($A_4$) were added at 18.5 wt % and 5.9 wt %, respectively. Thus, a liquid crystal composition which selectively reflects light of around 550 nm was prepared. The chiral agents ($F_2$) and ($A_4$) used in this example have the same helical sense. Specifically, the chiral agent ($A_4$) used in this example is an optical isomer of the chiral agent ($A_4$) used in experimental example 2.

The temperature dependency of the wavelength of light selectively reflected by this liquid crystal composition was measured. As a result, the wavelength of light selectively reflected by the liquid crystal composition changes within approximately 10 nm in a temperature range from 25° C. to 60° C. The phase transition temperature to isotropic phase of the liquid crystal composition was 65° C.

A liquid crystal display was produced using this liquid crystal composition in the same procedure carried out in experimental example 1.

In the liquid crystal display, when a pulse voltage of 60 V was applied for five milliseconds, the liquid crystal came to a focal-conic state (became transparent), and the Y value was 2.07. When a pulse voltage of 90 V was applied for five milliseconds, the liquid crystal came to a planar state (showed green), and the Y value was 20.46. Accordingly, the contrast was 9.88. The color purity was 58.6, and the reflectance was 34.8.

EXPERIMENTAL EXAMPLE 3

To nematic liquid crystal which contains the mixture of ester compounds used in experimental example 1 at 58 wt %, the chiral agents of the chemical formulas ($D_5$) and ($A_4$) were added at 29.5 wt % and at 3.7 wt %, respectively. Thus, a liquid crystal composition which selectively reflects light of around 550 nm was prepared. The chiral agents ($A_4$) and ($D_5$) used in this example have mutually opposite helical senses. The helical power of the chiral agent ($D_5$) used as the principle component is positive temperature dependent, and that of the chiral agent ($A_4$) used as the side component is negative temperature dependent. The temperature dependency of the helical power of the chiral agent ($D_5$) is smaller than that of the chiral agent ($A_4$).

The temperature dependency of the wavelength of light selectively reflected by this liquid crystal composition was measured. As a result, the wavelength of light selectively reflected by the liquid crystal composition changed within approximately 10 nm in a temperature range from 25° C. to 60° C. The phase transition temperature to isotropic phase was 80° C.

A liquid crystal display was produced using this liquid crystal composition in the same procedure carried out in experimental example 1.

In the liquid crystal display, when a pulse voltage of 50 V was applied between the electrodes for five milliseconds, the liquid crystal came to a focal-conic state (became transparent), and the Y value was 1.33. When a pulse voltage of 90 V was applied for five milliseconds, the liquid crystal came to a planar state (showed green), and the Y value was 21.4. Accordingly, the contrast was 16.1. The color purity was 60.9, and the reflectance was 38.2.

EXPERIMENTAL EXAMPLE 4

To nematic liquid crystal which contains the mixture of tolan compounds used in experimental example 2 at 5 wt %, the chiral agents of the chemical formulas ($E_6$) and ($A_2$) were added at 25.2 wt % and 1.24 wt %, respectively. Thus, a liquid crystal composition which selectively reflects light of around 680 nm was prepared. The chiral agents ($A_2$) and ($E_6$) used in this example have mutually opposite helical senses. The helical power of the chiral agent ($E_6$) used as the principle component is positive temperature dependent, and that of the chiral agent ($A_2$) used as the side component is negative temperature dependent. The temperature dependency of the helical power of the chiral agent ($E_6$) is smaller than that of the chiral agent ($A_2$).

The temperature dependency of the wavelength of light selectively reflected by this liquid crystal composition was measured. As a result, the wavelength of light selectively reflected by the liquid crystal composition changed within approximately 10 nm in a temperature range from 25° C. to 60° C. The phase transition temperature to isotropic phase of the liquid crystal composition was 75° C.

A liquid crystal display was produced using this liquid crystal composition. The procedure of producing the liquid crystal display was basically the same as carried out in experimental example 1, and further, a color filter (red) with a thickness of 1000 Å was provided on the substrate in the observing side.

In the liquid crystal display, when a pulse voltage of 60 V was applied between the electrodes for five milliseconds, the liquid crystal came to a focal-conic state (became transparent), and the Y value was 0.89. When a pulse voltage of 120 V was applied for five milliseconds, the liquid crystal came to a planar state (showed red), and the Y value was 3.6. Accordingly, the contrast was 4.05. The color purity was 80.4, and the reflectance was 33.7.

EXPERIMENTAL EXAMPLE 5

To nematic liquid crystal which contains a mixture of liquid crystal ester compounds at 56 wt % (anisotropy of refractive index $\Delta n=0.179$, anisotropy of dielectric constant $\Delta\epsilon=30$, phase transition temperature to isotropic phase $T_{N-I}=100°$ C.), the chiral agents of the chemical formulas ($D_4$) and ($A_7$) were added at 32.86 wt % and 2.97 wt %, respectively. Thus, a liquid crystal composition which selectively reflects light of around 490 nm was prepared. The chiral agents of the chemical formulas ($D_4$) and ($A_7$) used in this example have mutually opposite helical senses. The helical power of the chiral agent ($D_4$) used as the principal component is positive temperature dependent, and that of the chiral agent ($A_7$) used as the side component is negative temperature dependent. The temperature dependency of the helical power of the chiral agent ($D_4$) is smaller than that of the chiral agent ($A_7$).

The temperature dependency of the wavelength of light selectively reflected by the liquid crystal composition was measured. As a result, the wavelength of light selectively reflected by the liquid crystal composition changed within approximately 10 nm in a temperature range from 25° C. to 60° C. The phase transition temperature to isotropic phase of this liquid crystal composition was 80° C.

A liquid crystal display was produced using this liquid crystal composition in the same procedure carried out in experimental example 1.

In the liquid crystal display, when a pulse voltage of 50 V was applied between the electrodes for five milliseconds, the liquid crystal came to a focal-conic state (became transparent), and the Y value was 1.46. When a pulse voltage of 90 V was applied for five milliseconds, the liquid crystal came to a planar state (showed blue), and the Y value was 8.56. Accordingly, the contrast was 5.86. The color purity was 69.8, and the reflectance was 43.5.

EXPERIMENTAL EXAMPLE 6

In this example, on a liquid crystal display which selectively reflects light of around 680 nm (red), a liquid crystal display which selectively reflects light of around 550 nm (green) and a liquid crystal display which selectively reflects light of around 490 nm (blue) were laminated and joined by a transparent adhesive. The red liquid crystal display was produced from the same materials and in the same procedure as in experimental example 4. The green liquid crystal display was produced from the same materials and in the same procedure as in experimental example 1 except not having a light absorbing layer. The blue liquid crystal display was produced from the same materials and in the same procedure as in experimental example 5 except not having a light absorbing layer. Thus, a liquid crystal display which has blue, green and red display layers in this order from the observing side was produced. This liquid crystal display made a good full-color display by switching each of the display layers among a planar state, a focal-conic state and an intermediate state between the focal-conic state and the planar state.

Other Embodiments

The cell may be of a network type which has a composite layer of a liquid crystal composition and a polymeric resin composition. The columnar polymeric structure 20 may be composed of shorter columns which extend to the middle of the space between the substrates.

Although the present invention has been described in connection with the preferred embodiments above, it is to be noted that various changes and modifications are possible to those who are skilled in the art. Such changes and modifications are to be understood as being within the present invention.

What is claimed is:

1. A liquid crystal composition comprising:
   liquid crystal; and
   chiral agents including two kinds of chiral agents, a principal component and a side component, at mutually different ratios which cause the liquid crystal to twist in mutually opposite directions;
   wherein the chiral agents are contained at 10 to 45 wt % of the liquid crystal composition, and wherein the prncipal component chiral agent and the side component chiral agent have helical powers which are opposite in temperature dependency, and the temperature dependency of the helical power of the principal component chiral agent is smaller than the temperature dependency of the side component chiral agent.

2. The liquid crystal composition according to claim 1, wherein the liquid crystal composition is a composition which contains nematic liquid crystal and a plurality of chiral agents and exhibits a cholesteric phase in a room temperature or a composition which contains nematic liquid crystal and a plurality of chiral agents and selectively reflects light in a visible spectrum.

3. The liquid crystal composition according to claim 2, wherein the chiral agents include liquid crystalline compounds at not less than 70 wt %.

4. The liquid crystal composition according to claim 2, wherein at least one of the chiral agents is a compound with an ester bond.

5. The liquid crystal composition according to claim 1, wherein the helical power of the chiral agent as the principle component is substantially independent on temperature in a temperature range from 20° C. to 60° C.

6. The liquid crystal composition according to claim 2, wherein the nematic liquid crystal is a liquid crystal mixture which comprises a liquid crystalline ester compound.

7. The liquid crystal composition according to claim 6, wherein the liquid crystalline ester compound is contained in the liquid crystal mixture at not less than 50 wt %.

8. The liquid crystal composition according to claim 2, wherein the nematic liquid crystal comprises a liquid crystalline tolan compound.

9. The liquid crystal composition according to claim 8, wherein the liquid crystalline tolan compound is contained in the liquid crystal mixture at not less than 50 wt %.

10. A liquid crystal light modulating device comprising:
a pair of substrates, at least one of which is transparent; and
a liquid crystal composition as claimed in claim 2 which is filled between the substrates.

11. The liquid crystal light modulating device according to claim 10, comprising:
a plurality of light modulating layers, each of which has a liquid crystal composition, which contains nematic liquid crystal and a plurality of chiral agents and exhibits a cholesteric phase in a room temperature or a composition which contains nematic liquid crystal and a plurality of chiral agents and selectively reflects light in a visible spectrum, between a pair of substrates, at least one of which is transparent; and
the liquid crystal compositions in the respective light modulating layers selectively reflect light of mutually different wavelengths.

12. The liquid crystal light modulating device according to claim 11, comprising:
three liquid crystal light modulating layers; and
the liquid crystal compositions in the liquid crystal light modulating layers selectively reflect light of three primary colors respectively.

* * * * *